(12) United States Patent
Dattawadkar

(10) Patent No.: US 10,663,049 B2
(45) Date of Patent: May 26, 2020

(54) TORQUE CONVERTER IMPELLER OR TURBINE INCLUDING REAR SIDE EMBOSSMENT

(71) Applicant: Schaeffler Technologies AG & Co. KG, Herzogenaurach (DE)

(72) Inventor: Aditya Dattawadkar, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 210 days.

(21) Appl. No.: 15/723,302

(22) Filed: Oct. 3, 2017

(65) Prior Publication Data

US 2019/0101201 A1 Apr. 4, 2019

(51) Int. Cl.
| | |
|---|---|
| *F16H 41/28* | (2006.01) |
| *F01D 5/02* | (2006.01) |
| *F16H 45/02* | (2006.01) |
| *F01D 5/03* | (2006.01) |
| *F16F 15/123* | (2006.01) |

(52) U.S. Cl.
CPC .............. *F16H 41/28* (2013.01); *F01D 5/02* (2013.01); *F01D 5/03* (2013.01); *F16H 45/02* (2013.01); *F16F 15/12353* (2013.01); *F16H 2041/285* (2013.01); *F16H 2045/0226* (2013.01); *F16H 2045/0263* (2013.01); *F16H 2045/0294* (2013.01)

(58) Field of Classification Search
CPC ....... F01D 5/03; F16H 41/28; F16H 2041/285
See application file for complete search history.

(56) References Cited

U.S. PATENT DOCUMENTS

| | | | | |
|---|---|---|---|---|
| 2,436,911 A | * | 3/1948 | Zeidler | F16D 33/20 416/180 |
| 2,474,298 A | * | 6/1949 | Zeidler | F16D 33/20 416/180 |
| 2,598,620 A | * | 5/1952 | Swift | F16H 41/28 416/180 |
| 2,599,461 A | * | 6/1952 | Koskinen | F16D 33/20 416/180 |
| 2,660,957 A | * | 12/1953 | Koskinen | F16H 41/28 416/180 |
| 2,692,562 A | * | 10/1954 | Zeidler | F16H 41/28 416/180 |
| 2,745,354 A | * | 5/1956 | English | F16H 41/28 416/180 |
| 2,752,859 A | * | 7/1956 | Zeidler | F16H 41/28 416/180 |
| 2,779,292 A | * | 1/1957 | Zeidler | F16H 41/28 416/180 |

(Continued)

*Primary Examiner* — Kevin R Steckbauer
(74) *Attorney, Agent, or Firm* — Davidson, Davidson & Kappel, LLC

(57) ABSTRACT

A torque converter impeller or turbine is provided. The torque converter impeller or turbine includes a plurality of blades and a shell including a rounded portion defining an annular bowl for receiving the blades on an interior surface of the shell. The interior surface of the shell is provided with at least one shell protrusion for each of the blades protruding away from the rounded portion. Each of the at least one shell protrusion contacts a radially extending circumferentially facing surface of the respective blade.

20 Claims, 4 Drawing Sheets

(56) References Cited

U.S. PATENT DOCUMENTS

| | | | | |
|---|---|---|---|---|
| 2,890,661 A | * | 6/1959 | Egbert | F16D 33/20 416/180 |
| 2,948,226 A | * | 8/1960 | Smirl | F16D 33/20 416/180 |
| 3,137,915 A | * | 6/1964 | Smirl | F16D 33/20 29/889.5 |
| 3,240,153 A | * | 3/1966 | Schrader | F16H 41/28 416/180 |
| 3,316,622 A | * | 5/1967 | Jandasek | F16H 41/28 29/889.5 |
| 3,545,883 A | * | 12/1970 | Iijima | F16H 41/28 416/197 R |
| 3,550,234 A | * | 12/1970 | Werner | B23P 15/006 29/889.5 |
| 3,808,809 A | * | 5/1974 | Upton | F16H 61/58 60/347 |
| 3,817,656 A | * | 6/1974 | Batteux | F16D 33/20 416/180 |
| 3,869,258 A | * | 3/1975 | Scott | F16D 33/18 29/889.5 |
| 3,886,740 A | * | 6/1975 | Krok | F16D 41/067 60/341 |
| 3,891,350 A | * | 6/1975 | Adachi | F16D 33/18 416/180 |
| 3,932,061 A | * | 1/1976 | Scott | F16D 33/18 416/180 |
| 4,059,365 A | * | 11/1977 | Ivey | B23P 11/02 416/174 |
| 4,143,561 A | * | 3/1979 | Melhorn | F16F 15/129 192/214.1 |
| 4,199,047 A | * | 4/1980 | Ling | F16H 45/02 192/3.3 |
| 4,584,835 A | * | 4/1986 | Nishi | F16H 41/28 29/889.5 |
| 4,697,417 A | * | 10/1987 | Billet | F16H 41/24 192/212 |
| 4,825,521 A | * | 5/1989 | Frotschner | F16H 41/28 228/162 |
| 4,868,365 A | * | 9/1989 | Farone | F16H 41/28 219/121.64 |
| 4,934,495 A | * | 6/1990 | Lemon | F16H 45/02 192/3.26 |
| 4,986,397 A | * | 1/1991 | Vierk | F16H 45/02 192/3.3 |
| 5,056,631 A | * | 10/1991 | Macdonald | F16H 45/02 192/107 R |
| 5,065,509 A | * | 11/1991 | Sahashi | F16H 41/28 29/889.21 |
| 5,109,604 A | * | 5/1992 | Koebele | F16H 41/28 29/889.21 |
| 5,113,654 A | * | 5/1992 | Sahashi | F16H 41/28 29/889.21 |
| 5,125,486 A | * | 6/1992 | Murata | F16H 45/02 192/208 |
| 5,209,330 A | * | 5/1993 | Macdonald | F16H 45/02 192/212 |
| 5,215,173 A | * | 6/1993 | Gimmler | F16H 45/02 192/3.29 |
| 5,224,576 A | * | 7/1993 | Fujimoto | F16H 45/02 192/212 |
| 5,241,820 A | * | 9/1993 | Fukunaga | F16H 41/26 60/330 |
| 5,282,362 A | * | 2/1994 | Renneker | F16H 41/28 29/889.5 |
| 5,310,033 A | * | 5/1994 | Shibayama | F16H 45/02 192/113.34 |
| 5,346,366 A | * | 9/1994 | Eguchi | B21D 53/267 29/889.21 |
| 5,348,127 A | * | 9/1994 | Murata | F16F 15/134 192/3.3 |
| 5,383,540 A | * | 1/1995 | MacDonald | F16H 45/02 192/201 |
| 5,456,343 A | * | 10/1995 | Murata | F16H 45/02 192/107 M |
| 5,462,145 A | * | 10/1995 | Gimmler | F16H 45/02 192/3.29 |
| 5,477,950 A | * | 12/1995 | Maloof | F16D 25/0635 192/3.29 |
| 5,480,012 A | * | 1/1996 | Polubinski | F16H 45/02 192/200 |
| 5,515,956 A | * | 5/1996 | Schoder | F16H 41/24 192/110 B |
| 5,522,220 A | * | 6/1996 | Locker | F16H 41/28 29/889.5 |
| 5,575,363 A | * | 11/1996 | Dehrmann | F16H 45/02 192/113.3 |
| 5,587,092 A | * | 12/1996 | Sullivan | B23K 11/26 219/113 |
| 5,590,750 A | * | 1/1997 | Graton | F16F 15/129 192/212 |
| 5,605,210 A | * | 2/1997 | Koike | F16H 45/02 192/3.29 |
| 5,660,258 A | * | 8/1997 | Bacon | F16H 45/02 192/207 |
| 5,667,043 A | * | 9/1997 | Dehrmann | F16H 45/02 192/113.36 |
| 5,682,969 A | * | 11/1997 | Ling | F16H 45/02 192/212 |
| 5,743,365 A | * | 4/1998 | Makino | F16H 45/02 192/212 |
| 5,868,025 A | * | 2/1999 | Fukuda | B21D 53/78 29/889.5 |
| 5,868,228 A | * | 2/1999 | Fukushima | F16F 15/1203 192/205 |
| 5,893,704 A | * | 4/1999 | Prater | F16H 41/28 29/889.5 |
| 5,946,962 A | * | 9/1999 | Fukuda | B21D 53/78 29/889.5 |
| 5,947,243 A | * | 9/1999 | MacDonald | F16H 45/02 192/3.29 |
| 5,964,328 A | * | 10/1999 | Fallu | F16H 45/02 192/212 |
| 5,988,981 A | * | 11/1999 | Dehrmann | F16H 41/24 416/197 C |
| 6,003,648 A | * | 12/1999 | Sudau | F16H 45/02 192/208 |
| 6,006,878 A | * | 12/1999 | Macdonald | F16H 45/02 192/212 |
| 6,053,292 A | * | 4/2000 | Macdonald | F16H 45/02 192/3.28 |
| 6,056,093 A | * | 5/2000 | Hinkel | F16H 41/26 192/212 |
| 6,237,221 B1 | * | 5/2001 | Mizobuchi | F16H 41/28 29/505 |
| 6,266,958 B1 | * | 7/2001 | Sasse | F16H 41/26 416/180 |
| 6,282,785 B1 | * | 9/2001 | Kolodziej | B23K 1/00 29/889 |
| 6,290,041 B1 | * | 9/2001 | Bechmann | F16H 41/30 192/3.29 |
| 6,406,262 B1 | * | 6/2002 | Kundermann | F16H 41/28 416/180 |
| 6,698,561 B2 | * | 3/2004 | Kundermann | F16H 45/02 192/3.29 |
| 6,712,186 B1 | * | 3/2004 | Arhab | F16H 45/02 192/3.29 |
| 6,742,637 B2 | * | 6/2004 | Ackermann | F16H 45/02 192/107 R |
| 6,851,532 B2 | * | 2/2005 | Back | F16H 45/02 192/113.35 |
| 6,866,130 B2 | * | 3/2005 | Kuwahara | F16H 45/02 192/212 |
| 6,899,210 B2 | * | 5/2005 | Tomiyama | F16H 45/02 192/3.29 |
| 6,932,203 B2 | * | 8/2005 | Schmid | F16H 41/30 192/3.3 |
| 7,000,747 B2 | * | 2/2006 | Back | F16H 45/02 192/113.36 |

(56) References Cited

U.S. PATENT DOCUMENTS

| | | | | |
|---|---|---|---|---|
| 7,011,196 B2* | 3/2006 | Sudau | ................... | F16H 45/02 |
| | | | | 192/113.36 |
| 7,147,090 B2* | 12/2006 | Ono | ................... | F16D 25/0635 |
| | | | | 192/3.29 |
| 7,353,924 B2* | 4/2008 | Hinkel | ................... | F16H 41/24 |
| | | | | 192/3.29 |
| 7,484,604 B2* | 2/2009 | Arhab | ................... | F16H 45/02 |
| | | | | 192/200 |
| 7,621,384 B2* | 11/2009 | Hinkel | ................... | F16H 45/02 |
| | | | | 192/110 B |
| 7,757,827 B2* | 7/2010 | Toya | ................... | F16H 45/02 |
| | | | | 192/107 R |
| 7,770,703 B2* | 8/2010 | Mauti | ................... | F16H 45/02 |
| | | | | 192/3.29 |
| 7,937,937 B2* | 5/2011 | Wolf | ................... | B23P 15/006 |
| | | | | 60/330 |
| 8,042,330 B2* | 10/2011 | Wiegert | ................... | F16H 41/28 |
| | | | | 60/364 |
| 8,881,393 B2* | 11/2014 | Nanbara | ................... | F16H 41/28 |
| | | | | 29/530 |
| 8,944,769 B2* | 2/2015 | Olsen | ................... | F01D 5/323 |
| | | | | 416/197 C |
| 9,169,734 B2* | 10/2015 | Woehler | ................... | F01D 5/323 |
| 9,243,702 B2* | 1/2016 | Resh | ................... | F16H 41/28 |
| 9,702,444 B2* | 7/2017 | Okamura | ................... | F16H 41/28 |
| 9,822,861 B2* | 11/2017 | Avins | ................... | F16H 41/28 |
| 10,012,083 B2* | 7/2018 | Steinberger | ................... | F01D 5/30 |
| 2007/0258820 A1* | 11/2007 | Uhler | ................... | F16H 41/28 |
| | | | | 416/204 A |
| 2008/0148724 A1* | 6/2008 | Wolf | ................... | B23P 15/006 |
| | | | | 60/364 |
| 2009/0000289 A1* | 1/2009 | Wiegert | ................... | F16H 41/28 |
| | | | | 60/361 |
| 2011/0150656 A1* | 6/2011 | Olsen | ................... | F01D 5/323 |
| | | | | 416/213 R |
| 2012/0291280 A1* | 11/2012 | Nanbara | ................... | F16H 41/28 |
| | | | | 29/889 |
| 2013/0022470 A1* | 1/2013 | Resh | ................... | F16H 41/28 |
| | | | | 416/223 R |
| 2014/0241893 A1* | 8/2014 | Woehler | ................... | F01D 5/323 |
| | | | | 416/220 R |
| 2015/0128418 A1* | 5/2015 | Okamura | ................... | F16H 41/28 |
| | | | | 29/889.5 |
| 2015/0308553 A1* | 10/2015 | Avins | ................... | F16H 41/28 |
| | | | | 192/3.29 |
| 2017/0108101 A1* | 4/2017 | Tsuzuki | ................... | F16H 41/28 |
| 2017/0260862 A1* | 9/2017 | Steinberger | ................... | F01D 5/048 |
| 2018/0257184 A1* | 9/2018 | Brucato | ................... | B23P 15/006 |
| 2018/0259047 A1* | 9/2018 | Hess | ................... | F16H 41/28 |

* cited by examiner

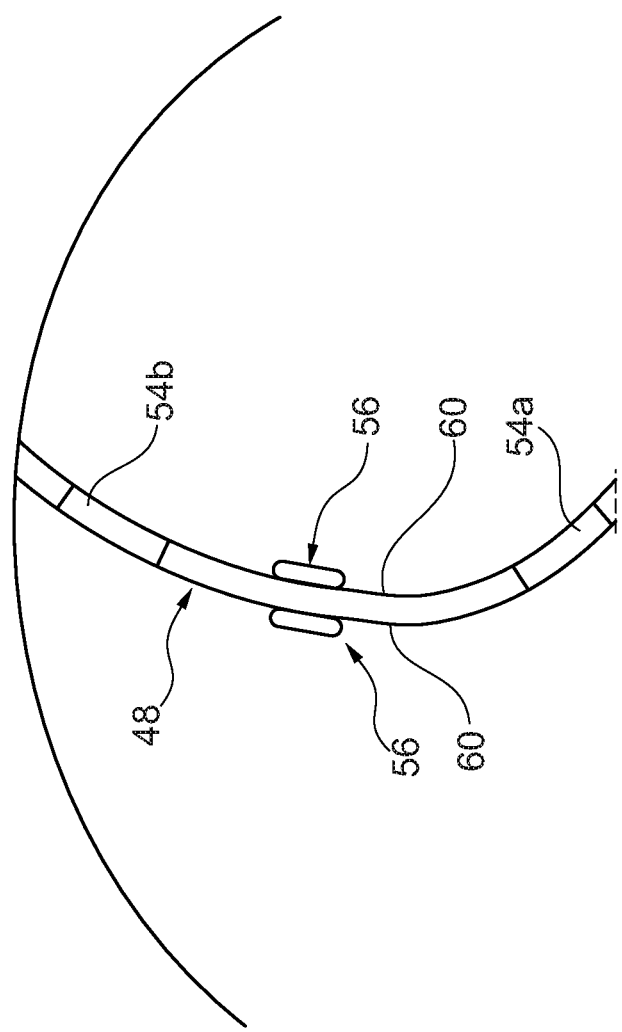
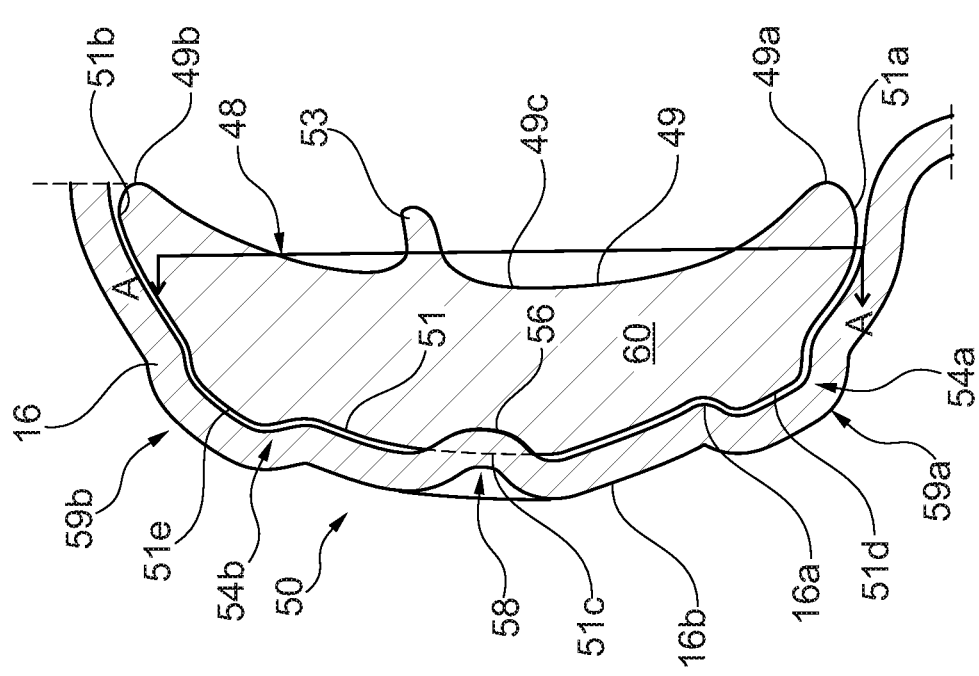

TORQUE CONVERTER IMPELLER OR TURBINE INCLUDING REAR SIDE EMBOSSMENT

The present disclosure relates generally to torque converters and more specifically to impellers or turbines of torque converters.

BACKGROUND

Conventionally, an internal surface of the impeller or turbine shell—the surface for supporting the impeller or turbine blades—is embossed to form one or more slots therein for supporting the blades. It is known to braze impeller or turbine blades to the impeller or turbine shell before the core ring is fixed to the impeller or turbine blades. The process flow of attaching the blades to the shell and core ring can be as follows: (1) blade tabs of the blades are put in shell slots in the shell and then the core ring is placed on top of blades tabs on core ring side; (2) the blades tabs on the core ring side are rolled; (3) the brazing paste is applied along the surfaces of the blade in contact with the shell and the core; and (4) the assembled part—i.e., the shell, the blades and the core ring—is then put through a brazing furnace to complete the brazing process.

U.S. Pat. No. 4,868,365 discloses welding the impeller blades using a laser beam. U.S. Pat. No. 6,237,221 discloses staking the impeller blades to the shell and core ring.

SUMMARY OF THE INVENTION

A torque converter impeller or turbine is provided. The torque converter impeller or turbine includes a plurality of blades and a shell including a rounded portion defining an annular bowl for receiving the blades on an interior surface of the shell. The interior surface of the shell is provided with at least one shell protrusion for each of the blades protruding away from the rounded portion. Each of the at least one shell protrusion contacts a radially extending circumferentially facing surface of the respective blade.

According to embodiments of the torque converter, each of the blades may include at least one blade protrusion each extending into a corresponding shell slot formed in the interior surface of the shell in the rounded portion. The at least one blade protrusion may include a first blade protrusion and a second blade protrusion for each blade. The first blade protrusion may be radially outside of the second blade protrusion. Each first blade protrusion may be received in a corresponding first shell slot of the shell slots and each second blade protrusion being received in a second shell slot of the shell slots. The shell protrusions may be formed radially between the first shell slots and the second shell slots. The at least one shell protrusion may include a first shell protrusion and a second shell protrusion for each blade. The first and second shell protrusions may contact opposite radially extending circumferentially facing surfaces of the respective blade. The first shell protrusion for each blade may be circumferentially aligned with the respective second shell protrusion.

A torque converter including the impeller or turbine is also provided.

A method of forming a torque converter impeller or turbine is also provided. The method includes forming a plurality of shell protrusions on an interior surface of a shell. The shell includes a rounded portion defining an annular bowl and the shell protrusions protrude away from the rounded portion. The method also includes inserting a plurality of blades in the rounded portion, each of the blades being aligned on the shell by at least one of the protrusions, each shell protrusion contacting a radially extending circumferentially facing surface of the respective blade.

According to embodiments of the method, each of the blades may include at least one blade protrusion, and the inserting a plurality of blades in the rounded portion may include inserting each of the blade protrusions into a corresponding shell slot formed in the interior surface of the shell in the rounded portion. The at least one blade protrusion may include a first blade protrusion and a second blade protrusion for each blade. The first blade protrusion may be radially outside of the second blade protrusion. Each first blade protrusion may be inserted into a corresponding first shell slot of the shell slots and each second blade protrusion may be inserted into a corresponding second shell slot of the shell slots. The shell protrusions may be formed radially between the first shell slots and the second shell slots. Each blade may be contacted by two of the shell protrusions such that the two shell protrusions each contact opposite radially extending circumferentially facing surfaces of the respective blade. The two shell protrusions for each blade may be circumferentially aligned with each other.

BRIEF DESCRIPTION OF THE DRAWINGS

The present disclosure is described below by reference to the following drawings, in which:

FIG. 2 shows a cross-sectional side view of an impeller of the torque converter shown in FIG. 1;

FIG. 3 shows a view of a rounded portion of the impeller shell and an exemplary impeller blade along A-A in FIG. 2;

DETAILED DESCRIPTION

Larger torus sizes include three embossments for each impeller blade on the interior surface of the impeller shell, but with smaller torus sizes it is hard to fit three embossments for each impeller blade on the interior surface of the impeller shell. Additionally, it is sometimes not possible to have embossments on the interior surface at the bottom of the torus due to assembly processes at transmission plants. Hence certain designs use two embossed slots on the interior surface of impeller shell for each impeller blade. However with only two slots for each blade, the blades may come out of the slots during rolling of blade tabs that connect the impeller blades to the core ring. In view of these issues, the present disclosure provides protrusions on the interior surface of the impeller shell that provide an additional support for the blades without having to make slots or embossments in conventional sense on the interior surface of the impeller shell and ensures not having a protrusion at an exterior surface of the base of impeller shell, which are conventionally caused by embossing the interior surface of the impeller shell at the base. As used herein, the base of the impeller shell refers to the bottom-most portion of shell. If the pump shell is rested on a table, the base is the surface on which the impeller shell rests. The protrusions may also help resist movement of the impeller blades during tab rolling and maintaining blade angles post brazing. In other embodiments, a turbine shell can be formed in the same manner to help in increasing clearance to other internal components of the torque converter.

Figure 1:
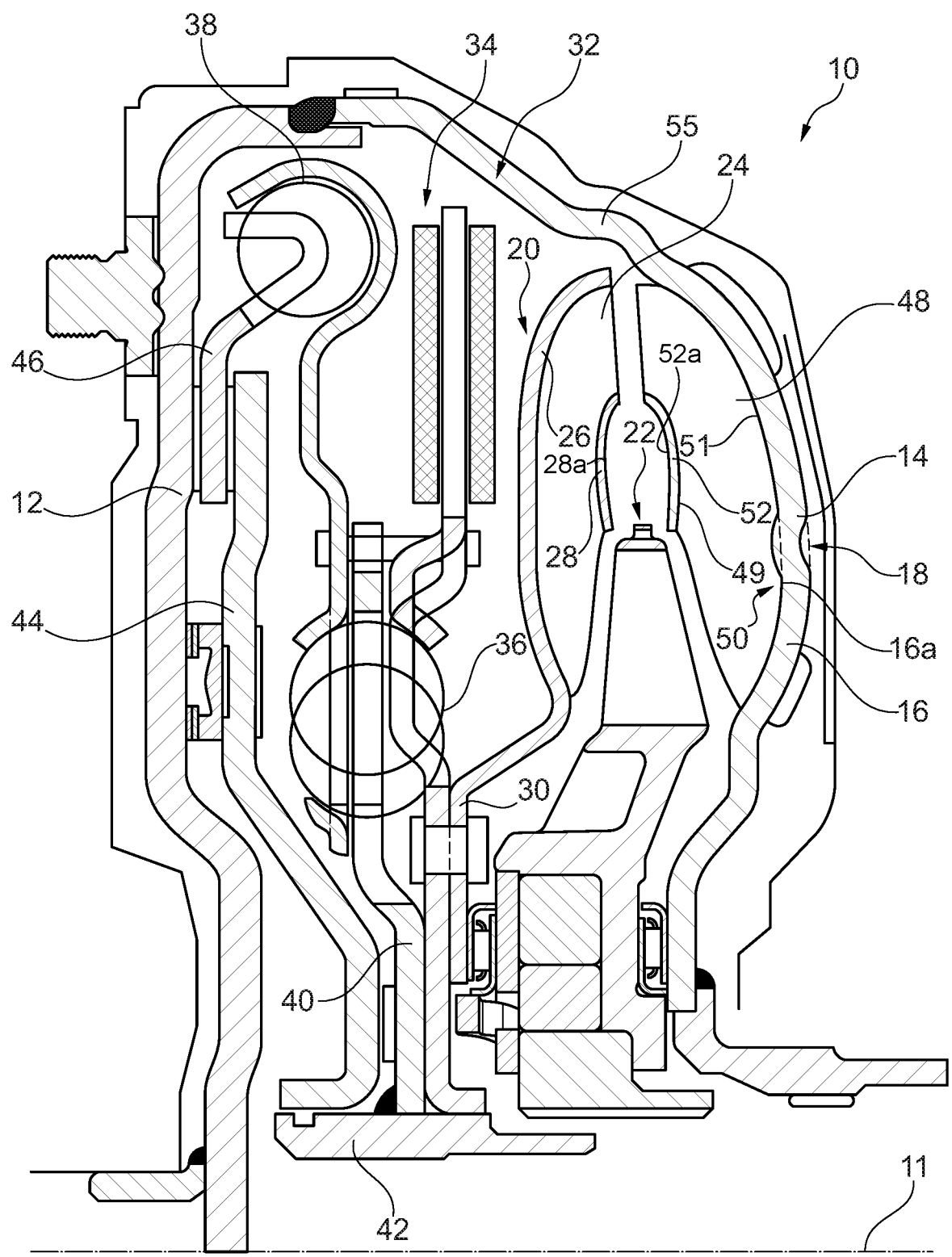
FIG. 1 shows a cross-sectional side view of a torque converter in accordance with an embodiment of the present disclosure.

FIG. 1 shows a cross-sectional side view of a torque converter 10 in accordance with an embodiment of the present disclosure. Torque converter 10 is rotatable about a center axis 11 and includes a front cover 12 for connecting to a crankshaft of an internal combustion engine and a rear cover 14 forming a shell 16 of an impeller or pump 18. The terms axially, radially and circumferentially as used herein are used with respect to center axis 11. Torque converter 10 also includes a turbine 20 opposite impeller 18 and a stator 22 axially between impeller 18 and turbine 20. Turbine 20 includes a plurality of blades 24 supported on a rounded portion of a turbine shell 26 at a rear-cover side of turbine shell 26 and supported on a core ring 28 in accordance with an embodiment of the present disclosure. Turbine 20 further includes an inner radial extension 30 protruding radially inward from rounded portion 26. On a front-cover side of turbine 20, turbine 20 is connected to a damper assembly 32.

Damper assembly 32 includes a CPA 34, two sets of springs 36, 38 and a drive flange 40 whose inner radial end is configured as a hub 42 for connecting to a transmission input shaft. A piston 44 is provided between front cover 12 and damper assembly 32 and a clutch plate 46 is provided axially between piston 44 and front cover 12. Clutch plate 46 is provided with a friction material on a front cover side thereof for engaging an inner axial surface of front cover 12 and a friction material on a rear cover side thereof for engaging piston 44. Piston 44, clutch plate 46 and the inner axial surface of front cover 12 form a lockup clutch for drivingly coupling turbine 20 to front cover 12 via damper assembly 32 to drive flange 40 welded to hub 42, which then drives the transmission input shaft. Fluid pressure differences between a front cover side of piston 44 and a rear cover side of piston 44 control whether piston 44 engages or is disengaged from front cover 12.

Impeller 18 also includes a plurality of blades 48 supported on a rounded portion 50 of impeller shell 16, which has the shape of an annular bowl and joins an outer axially extending section 55 of impeller shell 16, at a turbine side of impeller shell 16 and supported on a core ring 52. More specifically, a turbine facing edge 49 of each blade 48 contacts core ring 52 and an impeller facing edge 51 of each blade 48 contacts an internal or turbine facing surface 16a of impeller shell 16.

FIG. 2 shows an enlarged cross-sectional view of a rounded portion 50 of impeller shell 16 holding an impeller blade 48 before core ring 52 (FIG. 1) is attached to impeller blades 48. Turbine facing edge 49 follows a substantially concave curved path between a radially innermost end 49a thereof to a radially outermost end 49b thereof, with edge 49 extending radially outward from innermost end 49a while extending axially away from turbine 20 to a peak 49c that is axially furthest from turbine 20 and then back axially toward turbine 20 to outermost end 49b. The substantially concave curved path is interrupted by impeller blade tabs 53 that pass through slots passing through core ring 52 in known manner and are bent onto a turbine facing surface 52a of core ring 52. Impeller shell facing edge 51 of blade 48 follows a substantially convex curved path between a radially innermost end 51a thereof to a radially outermost end 51b thereof, with edge 51 extending radially outward from innermost end 51a while extending axially away from turbine 20 to a peak 51c that is axially furthest from turbine 20 and then back axially toward turbine 20 to outermost end 51b. The substantially convex curved path is interrupted by protrusions 51d, 51e on edge 51.

In order to hold impeller blades 48 in rounded portion 50 of impeller shell 16, interior surface 16a of rounded portion 50 is provided with slots 54a, 54b extending away from blades 48 and partially into rounded portion 50 and at least one protrusion 56 extending toward blades 48 and away from rounded portion 50. Slots 54a, 54b may be formed in rounded portion 50 by embossing interior surface 16a and protrusion 56 may be formed in rounded portion 50 by embossing exterior surface 16b. The formation of protrusion 56 by embossment results in an indentation 58 in exterior surface 16b and the formation of slots 54a, 54b in interior surface 16a results in respective protrusions 59a, 59b on exterior surface 16b. Slots 54a, 54b each receive a respective one of protrusions 51d, 51e in a form fitting manner 51d such that friction between protrusions 51d, 51e and the respective slot 54a, 54b hold protrusions 51d, 51e within slots 54a, 54b. Protrusions 56 each extend axially past edge 51 of impeller blade to contact a radially extending circumferentially facing surface 60 of the respective impeller blade 48.

In the embodiment shown in FIG. 2, the radially inner slot 54a is provided on the radially inner half of rounded portion 50 and the radially outer slot 54b is provided on the radially outer half of rounded portion 50, with protrusion 56 being provided radially between slots 54a, 54b and being aligned with peak 51c of edge 51.

FIG. 3 shows a view of rounded portion 50 of impeller shell 16 and an exemplary impeller blade 48 along A-A in FIG. 2. It should be understood that as is conventional, impeller 18 includes a plurality of circumferentially spaced impeller blades 48, but only one is shown in FIG. 3 for clarity reasons. Slots 54a, 54b each include a radially extending elongate shape when viewed axially for receiving the respective protrusion 51d, 51e (FIG. 2). FIG. 3 shows two protrusions 56 for gripping opposite sides of one blade 48, with the first protrusions 56 contacting one of the two radially extending circumferentially facing surfaces 60 of blade 48 and the second protrusion 56 contacting the other of the two radially extending circumferentially facing surface 60 of blade 48. The first shell protrusion 56 is circumferentially aligned with the second shell protrusion 56, with the first and second shell protrusions 56 being at a same radial distance from the center axis of the impeller 16. Slot 54b is positioned radially closest to outer axially extending section 55 (FIG. 1) of impeller shell 16, with protrusions 56, which are circumferentially aligned with each other in this embodiment, being further radially from outer axially extending section 55 than slot 54a and slot 54b being further radially from outer axially extending section 55 than slot 54a and protrusions 56.

Figure 4:
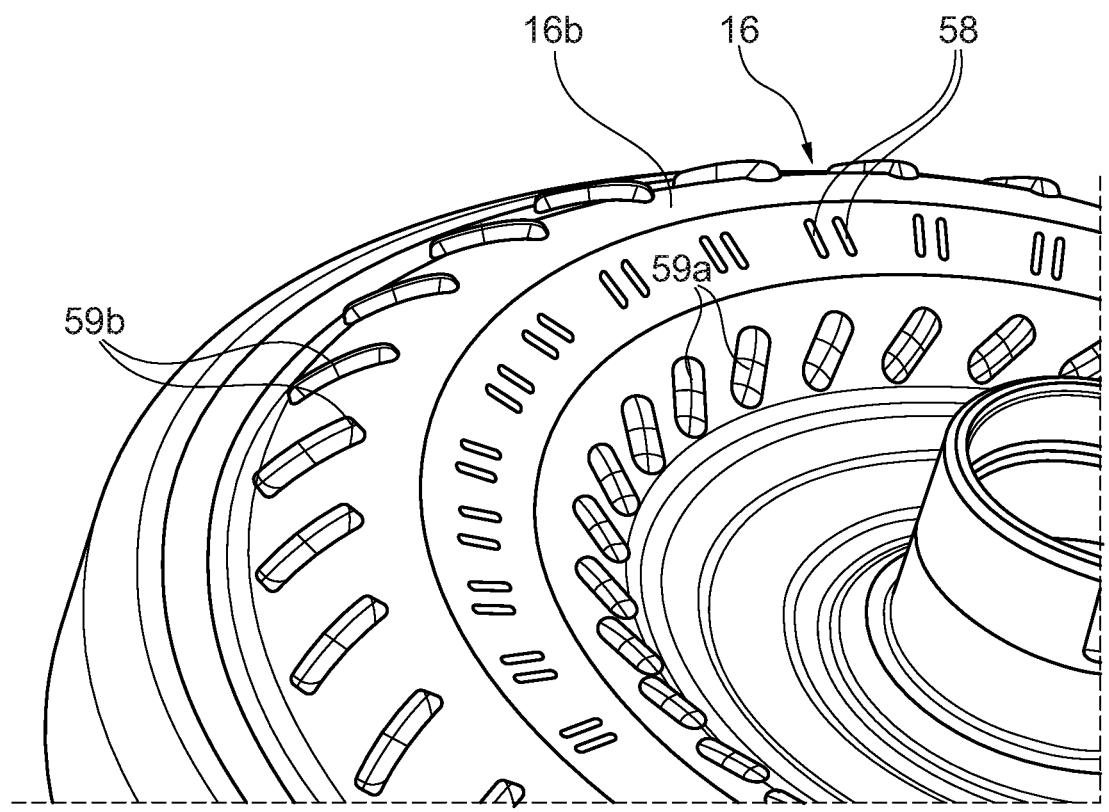
FIG. 4 shows a perspective view of a section of an exterior of the impeller shell shown in FIGS. 1 to 3.

FIG. 4 shows a perspective view of a section of an exterior of impeller shell 16. As can be seen in FIG. 4, exterior surface 16b is provided with a plurality of circumferentially spaced radially inner protrusions 59a and a plurality of circumferentially spaced radially outer protrusions 59b, with the number of protrusions 59a being equal to the number of protrusions 59b such that each blade 48 (FIGS. 1 to 3) is aligned with one protrusion 59a and one protrusion 59b. Exterior surface 16b is also provided with a plurality of indentations 58, with two indentations 58 being provided for each pair of protrusions 59a, 59b. As noted above, of each pair of indentations 58, a first indentation 58 forms a first protrusion 56 (FIGS. 1 to 3) for contacting a first circumferentially facing surfaces 60 (FIGS. 1 to 3) of a blade 48 and a second indentation 58 forms a second protrusion 56 for contacting a second circumferentially facing surfaces 60 of the same blade 48.

Figure 5:
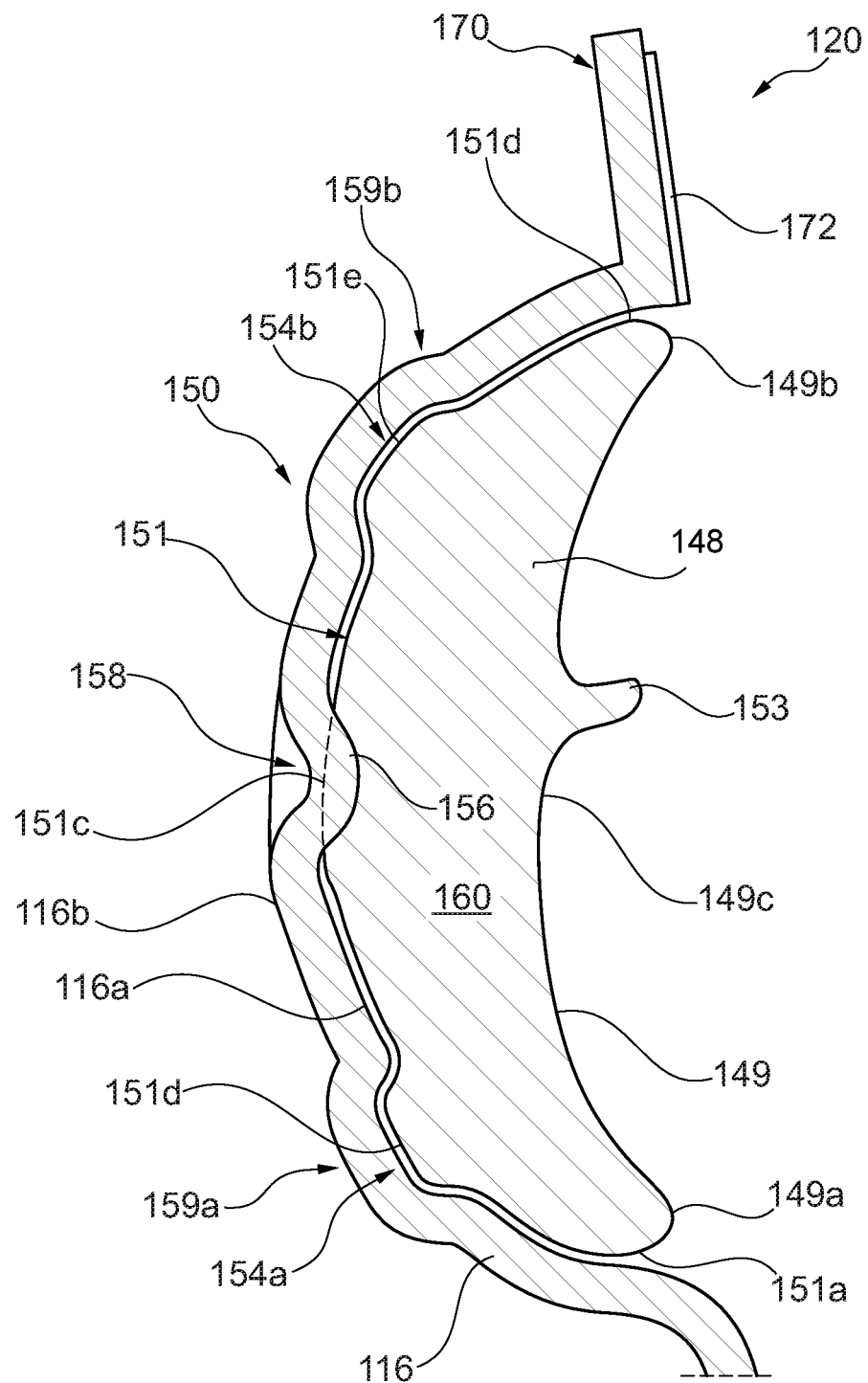
FIG. 5 shows a cross-sectional side view of a torque converter turbine in accordance with an embodiment of the present disclosure.

FIG. 5 shows another embodiment of the present disclosure, in which a rounded portion 150 of a turbine shell 116 of a turbine 120 holds a turbine blade 148 before a core ring is attached to turbine blades 148 via turbine blade tabs 153. An impeller facing edge 149 follows a substantially concave curved path between a radially innermost end 149a thereof to a radially outermost end 149b thereof, with edge 149 extending radially outward from innermost end 149a while extending axially away from impeller 18 (FIG. 1) to a peak 149c that is axially furthest from the impeller and then back axially toward the impeller to outermost end 149b. The substantially concave curved path is interrupted by turbine blade tabs 153 that pass through slots passing through core ring 28 (FIG. 1) in known manner and are bent onto an impeller facing surface 28a (FIG. 1) of core ring 28. Turbine shell facing edge 151 of blade 148 follows a substantially convex curved path between a radially innermost end 151a thereof to a radially outermost end 151b thereof, with edge 151 extending radially outward from innermost end 151a while extending axially away from impeller 18 to a peak 151c that is axially furthest from impeller 18 and then back axially toward impeller 18 to outermost end 151b. The substantially convex curved path is interrupted by protrusions 151d, 151e on edge 151.

In order to hold turbine blades 148 in rounded portion 150 of turbine shell 116, interior surface 116a of rounded portion 150 is provided with slots 154a, 154b extending away from blades 148 and partially into rounded portion 150 and at least one protrusion 156 extending toward blades 148 and away from rounded portion 150. Slots 154a, 154b may be formed in rounded portion 150 by embossing interior surface 116a and protrusion 156 may be formed in rounded portion 150 by embossing exterior surface 116b. The formation of protrusion 156 by embossment results in an indentation 158 in exterior surface 116b and the formation of slots 154a, 154b in interior surface 16a results in respective protrusions 159a, 159b on exterior surface 116b. Slots 154a, 154b each receive a respective one of protrusions 151d, 151e in a form fitting manner such that friction between protrusions 151d, 151e and the respective slot 154a, 154b hold protrusions 151d, 151e within slots 154a, 154b. Protrusions 156 each extend axially past edge 151 of turbine blade to contact a radially extending circumferentially facing surface 160 of the respective turbine blade 148.

In the embodiment shown in FIG. 5, the radially inner slot 154a is provided on the radially inner half of rounded portion 150 and the radially outer slot 154b is provided on the radially outer half of rounded portion 150, with protrusion 156 being provided radially between slots 154a, 154b and being aligned with peak 151c of edge 151.

Turbine 120 is a turbine piston configured for forming part of a lockup clutch of the torque converter, as described for example in U.S. Pub. 2017/0191555, the description of lockup clutch is hereby incorporated by reference herein. Radially outside of rounding blade supporting portion 150, turbine shell 116 includes an outer radial extension 170 radially protruding outwardly from an outer circumference of blade supporting portion 150. A friction material 172 is bonded onto a surface of outer radial extension 170 for engaging a radially extending wall of the impeller shell as described in U.S. Pub. 2017/0191555. In other embodiments, instead of or in addition to being bonded to outer radial extension 170, friction material 172 may be bonded to the radially extending wall of the impeller shell or to one or more discs provided by outer radial extension 170 and the radially extending wall of the impeller shell.

In the preceding specification, the disclosure has been described with reference to specific exemplary embodiments and examples thereof. It will, however, be evident that various modifications and changes may be made thereto without departing from the broader spirit and scope of disclosure as set forth in the claims that follow. The specification and drawings are accordingly to be regarded in an illustrative manner rather than a restrictive sense.

LIST OF REFERENCE NUMERALS 10 torque converter
11 center axis
12 front cover
14 rear cover
16 impeller shell
16a turbine facing or interior surface
16b exterior surface
18 impeller
20 turbine
22 stator
24 turbine blades
26 turbine shell
28 core ring
30 inner radial extension
32 damper assembly
34 centrifugal pendulum assembly
36 springs
38 springs
40 drive flange
42 damper hub
44 piston
46 clutch plate
48 impeller blades
49 turbine facing edge
49a radially innermost end
49b radially outermost end
49c peak
50 rounded portion
51 impeller facing edge
51a radially innermost end
51b radially outermost end
51c peak
51d protrusion
51e protrusion
52 core ring
52a turbine facing surface
53 blade tabs
54a radially inner slot
54b radially outer slot
55 outer axially extending section
56 impeller blade contacting protrusion
58 indentation
59a radially inner protrusion
59b radially outer protrusion
60 radially extending circumferentially facing surface
148 turbine blades
149 impeller facing edge
149a radially innermost end
149b radially outermost end
149c peak
150 rounded portion
151 turbine shell facing edge
151a radially innermost end
151b radially outermost end 151c peak
151d protrusion
151e protrusion
153 blade tabs
154a radially inner slot
154b radially outer slot
156 turbine blade contacting protrusion
158 indentation
159a radially inner protrusion
159b radially outer protrusion
170 outer radial extension
172 friction material

What is claimed is:

1. A torque converter impeller or turbine comprising:
a plurality of blades; and
a shell including a rounded portion defining an annular bowl for receiving the blades on an interior surface of the shell, the interior surface of the shell being provided with at least one shell protrusion for each of the blades protruding away from the rounded portion, each of the at least one shell protrusions contacting a radially extending circumferentially facing surface of the respective blade, each of the at least one shell protrusions being formed from an embossed material of the shell.

2. The torque converter impeller or turbine as recited in claim 1 wherein each of the blades includes at least one blade protrusion each extending into a corresponding shell slot formed in the interior surface of the shell in the rounded portion.

3. The torque converter impeller or turbine as recited in claim 2 wherein the at least one blade protrusion includes a first blade protrusion and a second blade protrusion for each blade, the first blade protrusion being radially outside of the second blade protrusion, each first blade protrusion being received in a corresponding first shell slot of the shell slots and each second blade protrusion being received in a second shell slot of the shell slots.

4. The torque converter impeller or turbine as recited in claim 3 wherein the shell protrusions are formed radially between the first shell slots and the second shell slots.

5. The torque converter impeller or turbine as recited in claim 1 wherein the at least one shell protrusion includes a first shell protrusion and a second shell protrusion for each blade, the first and second shell protrusions contacting opposite radially extending circumferentially facing surfaces of the respective blade.

6. The torque converter impeller or turbine as recited in claim 5 wherein the first shell protrusion for each blade is circumferentially aligned with the respective second shell protrusion.

7. A torque converter comprising:
the torque converter impeller or turbine as recited in claim 1.

8. The torque converter impeller or turbine as recited in claim 1 further comprising a plurality of indentations on an exterior surface of the shell, each of the indentations being aligned with a corresponding one of the shell protrusions.

9. The torque converter impeller or turbine as recited in claim 5 wherein a convex curved edge of each of the blades is received between the first shell protrusion and the second shell protrusion contacting the respective blade.

10. A method of forming a torque converter impeller or turbine comprising:
forming a plurality of shell protrusions on an interior surface of a shell by embossing an exterior surface of the shell, the shell including a rounded portion defining an annular bowl, the shell protrusions protruding away from the rounded portion; and
inserting a plurality of blades in the rounded portion, each of the blades being aligned on the shell by at least one of the protrusions, each shell protrusion contacting a radially extending circumferentially facing surface of the respective blade.

11. The method as recited in claim 10 wherein each of the blades includes at least one blade protrusion, the inserting a plurality of blades in the rounded portion including inserting each of the blade protrusions into a corresponding shell slot formed in the interior surface of the shell in the rounded portion.

12. The method as recited in claim 11 wherein the at least one blade protrusion includes a first blade protrusion and a second blade protrusion for each blade, the first blade protrusion being radially outside of the second blade protrusion, each first blade protrusion being inserted into a corresponding first shell slot of the shell slots and each second blade protrusion being inserted into a corresponding second shell slot of the shell slots.

13. The method as recited in claim 12 wherein the shell protrusions are formed radially between the first shell slots and the second shell slots.

14. The method as recited in claim 10 wherein each blade is contacted by two of the shell protrusions such that the two shell protrusions each contact opposite radially extending circumferentially facing surfaces of the respective blade.

15. The method as recited in claim 14 wherein the two shell protrusions for each blade are circumferentially aligned with each other.

16. The method as recited in claim 11 further comprising forming the shell slots by embossing the interior surface of the shell.

17. The method as recited in claim 10 wherein the forming of the plurality of shell protrusions on the interior surface of the shell includes forming a plurality of indentations on the exterior surface of the shell by the embossing of the exterior surface of the shell.

18. The method as recited in claim 10 further comprising brazing the blades to the shell.

19. A torque converter impeller or turbine comprising:
a plurality of blades; and
a shell including a rounded portion defining an annular bowl for receiving the blades on an interior surface of the shell, the interior surface of the shell being provided with at least one shell protrusion for each of the blades protruding away from the rounded portion, each of the at least one shell protrusions contacting a radially extending circumferentially facing surface of the respective blade,
the at least one shell protrusion including a first shell protrusion and a second shell protrusion for each blade, the first and second shell protrusions contacting opposite radially extending circumferentially facing surfaces of the respective blade,
a convex curved edge of each of the blades being received between the first shell protrusion and the second shell protrusion contacting the respective blade,
the blade including at least one blade protrusion extending from the convex curved edge.

20. The torque converter impeller or turbine as recited in claim 19 wherein an axial peak of the convex curved edge of each of the blades is received between the first shell protrusion and the second shell protrusion contacting the respective blade.

* * * * *